United States Patent
Smartt et al.

(10) Patent No.: US 8,622,135 B2
(45) Date of Patent: Jan. 7, 2014

(54) APPARATUS AND METHODS FOR SEPARATING SAND FROM WELL FRACTURING RETURN WATER

(76) Inventors: Cooper Smartt, Sweetwater, TX (US); Billy Smartt, Sweetwater, TX (US)

(*) Notice: Subject to any disclaimer, the term of this patent is extended or adjusted under 35 U.S.C. 154(b) by 387 days.

(21) Appl. No.: 12/898,319

(22) Filed: Oct. 5, 2010

(65) Prior Publication Data

US 2012/0080191 A1    Apr. 5, 2012

(51) Int. Cl.
*E21B 21/06* (2006.01)
*E21B 43/26* (2006.01)

(52) U.S. Cl.
USPC ................................................. 166/308.1

(58) Field of Classification Search
USPC ......... 166/308.1, 105.5; 210/623, 172.1, 188, 210/436, 451, 477, 482; 209/315; 96/219, 96/155; 95/259; 175/66
See application file for complete search history.

(56) References Cited

U.S. PATENT DOCUMENTS

| | | | | |
|---|---|---|---|---|
| 4,474,254 A * | 10/1984 | Etter et al. | ...................... | 175/206 |
| 4,639,258 A * | 1/1987 | Schellstede et al. | ............. | 95/260 |
| 4,871,454 A * | 10/1989 | Lott | .............................. | 210/205 |
| 4,904,603 A * | 2/1990 | Jones et al. | ...................... | 436/25 |
| 5,336,408 A * | 8/1994 | Tsutumi | ......................... | 210/384 |
| 5,405,223 A * | 4/1995 | Sirevag | ........................ | 405/129.2 |
| 5,593,582 A * | 1/1997 | Roff, Jr. | ......................... | 210/325 |
| 5,597,732 A * | 1/1997 | Bryan-Brown | ............ | 435/290.4 |
| 5,996,484 A * | 12/1999 | Reddoch | .......................... | 100/37 |
| 6,024,228 A * | 2/2000 | Williams | ....................... | 209/272 |
| 6,213,227 B1 * | 4/2001 | Dietzen | ........................... | 175/66 |
| 6,223,906 B1 * | 5/2001 | Williams | ....................... | 210/400 |
| 6,506,310 B2 * | 1/2003 | Kulbeth | ......................... | 210/780 |
| 6,533,946 B2 * | 3/2003 | Pullman | ........................ | 210/787 |
| 6,868,972 B2 * | 3/2005 | Seyffert et al. | ............... | 209/254 |
| 2002/0134550 A1 | 9/2002 | Leeson et al. | | |
| 2005/0098504 A1 | 5/2005 | Manz et al. | | |
| 2005/0205497 A1 * | 9/2005 | Hutchinson et al. | .......... | 210/767 |
| 2006/0186050 A1 | 8/2006 | Hanes, Jr. et al. | | |
| 2007/0034578 A1 * | 2/2007 | Brouillard et al. | ............ | 210/767 |
| 2009/0173490 A1 | 7/2009 | Dusterhoft et al. | | |

* cited by examiner

*Primary Examiner* — David Andrews
*Assistant Examiner* — Michael Wills, III
(74) *Attorney, Agent, or Firm* — Kenneth H. Ohriner; Perkins Coie LLP

(57) ABSTRACT

Apparatus and methods for removing sand or other particulate from well fracturing return water are disclosed. In a sand separator box, a barrier element divides the tank into an upper compartment and a lower compartment. Particulate-laden return water flows through a gas separator and then into the upper compartment of the box. The barrier element allows the water in the upper compartment to pass into the lower compartment while keeping the sand or particulate in the upper compartment. As water accumulates in the lower compartment, it is pumped out to storage tanks or back to the well for reuse.

4 Claims, 5 Drawing Sheets

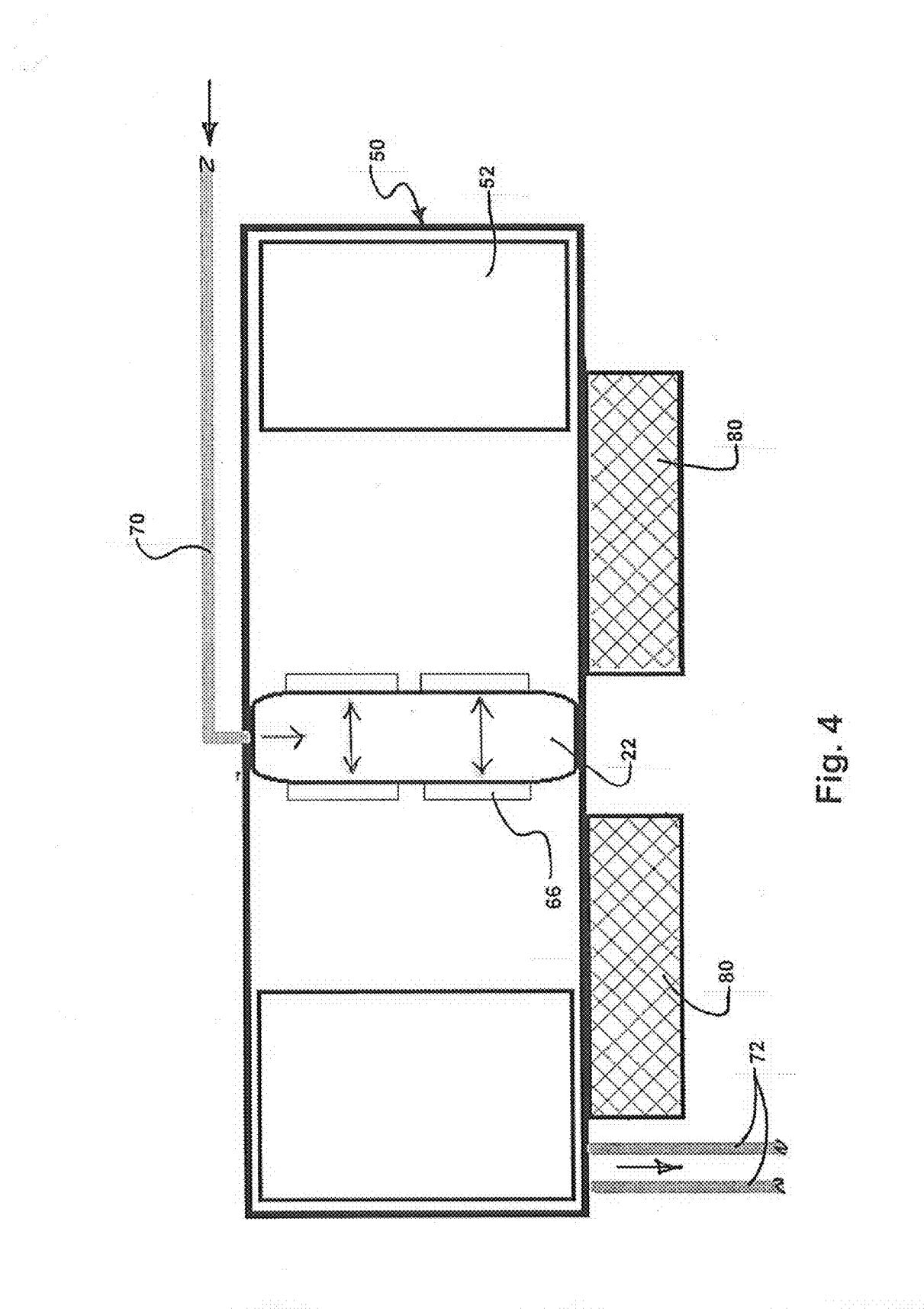

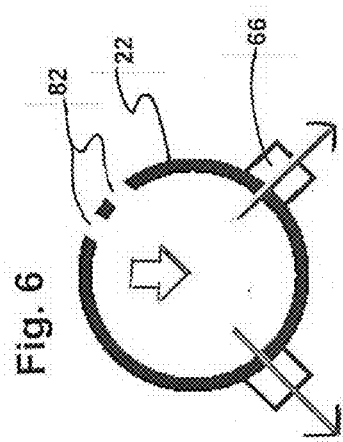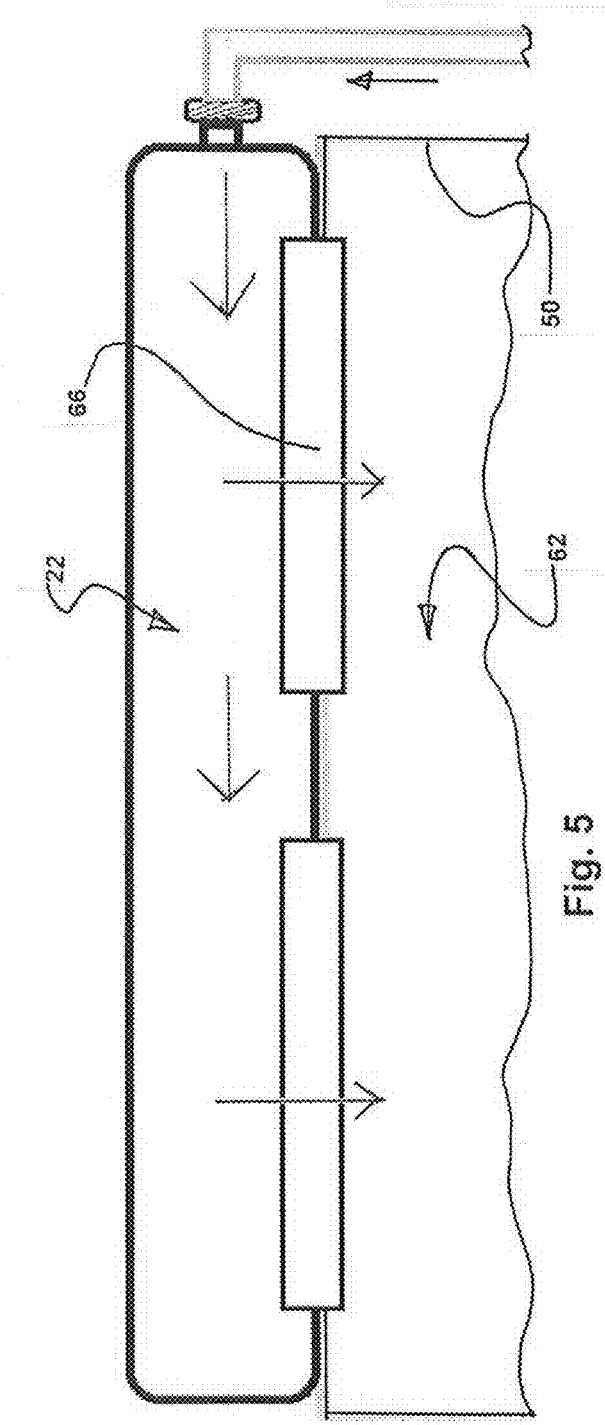

APPARATUS AND METHODS FOR SEPARATING SAND FROM WELL FRACTURING RETURN WATER

BACKGROUND OF THE INVENTION

The field of the invention is oil and gas well equipment. In oil and gas wells, sand or similar particulate material is often mixed with water and injected into the well under high pressure. The pressurized liquid helps to fracture underground formations around the well bore. This allows oil and/or gas in the underground formations to flow more freely to the well bore. The fracturing is achieved hydraulically via pumping the liquid into the well under high pressure. The sand acts a proppant to hold the underground fractures open after the water is removed.

As pressure on the well bore is released, the injected water returns back up and out of the well. For environmental and other reasons, the return water is captured and held in a holding reservoir or tank. The return water may then be reused in the fracturing process. The return water however typically contains a substantial amount of sand. The sand must be separated from the water. Various so-called sand trap or de-sanding apparatus have been developed for this purpose. However, these existing designs have various disadvantages in performance, efficiency, utility, cost or other factors. Accordingly, an improved sand separator is needed.

SUMMARY OF THE INVENTION

Novel apparatus and methods for removing sand or other particulate from return water have now been invented. In a first aspect of the invention, well equipment, includes a barrier element in a tank substantially dividing the tank into an upper compartment and a lower compartment. A gas separator is associated with the tank, with sand or particulate-laden water outflow from the gas separator moving into the upper compartment of the tank. The barrier element allows the water in the upper compartment to pass into the lower compartment while keeping the sand or particulate in the upper compartment.

Other objects, features and advantages will become apparent from the following detailed description.

BRIEF DESCRIPTION OF THE DRAWINGS

In the drawings, the same element number indicates the same element in each of the views.

FIG. 4 is a top view of the sand separator shown in FIG. 2.

FIG. 5 is a partial section view of the gas separator shown in FIG. 2.

FIG. 6 is a schematic section view of the gas separator shown in FIG. 5.

DETAILED DESCRIPTION OF THE DRAWINGS

Figure 1:
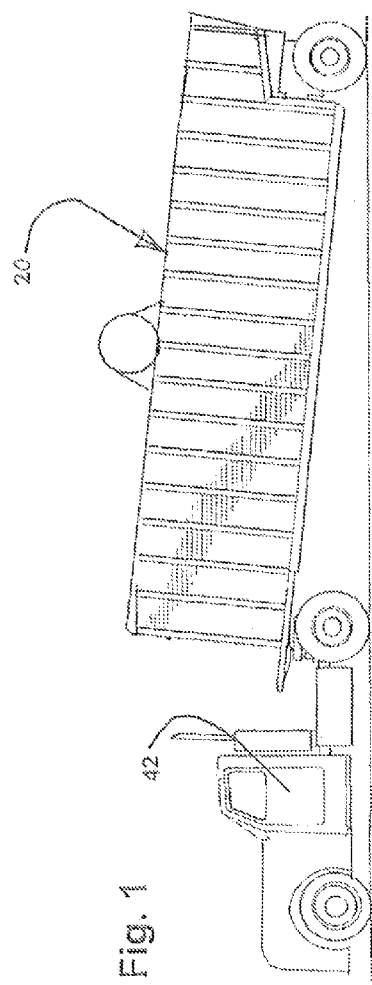
FIG. 1 is a side view of a new sand separator which may be used at oil, gas, or water well drilling sites, with the sand separator shown loading or unloading from a roll-off truck.
Figure 2:
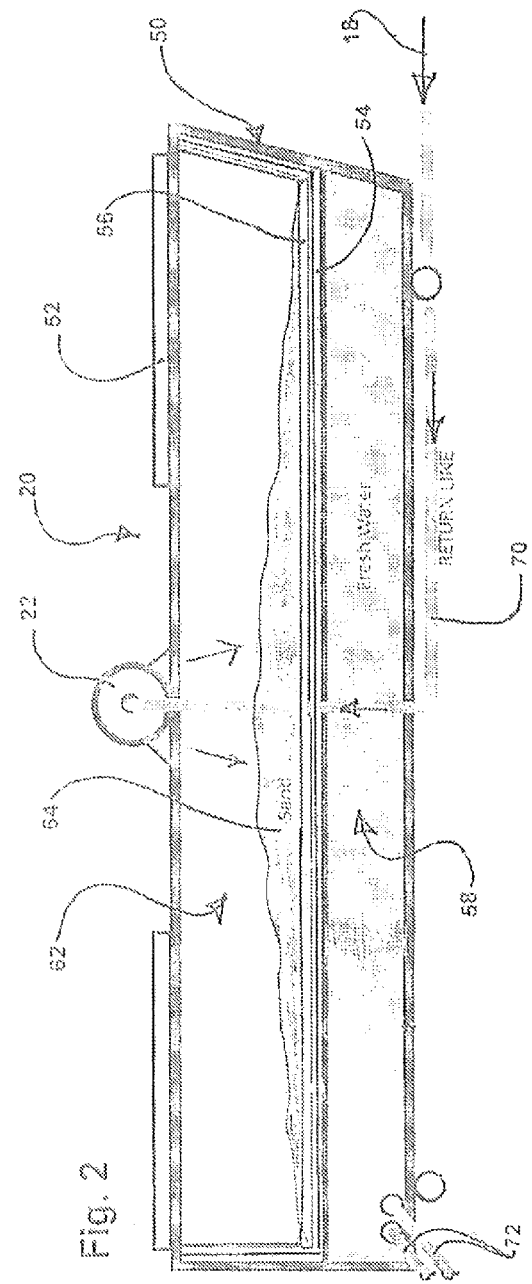
FIG. 2 is a side or longitudinal section view of the sand separator shown in FIG. 1.
Figure 3:
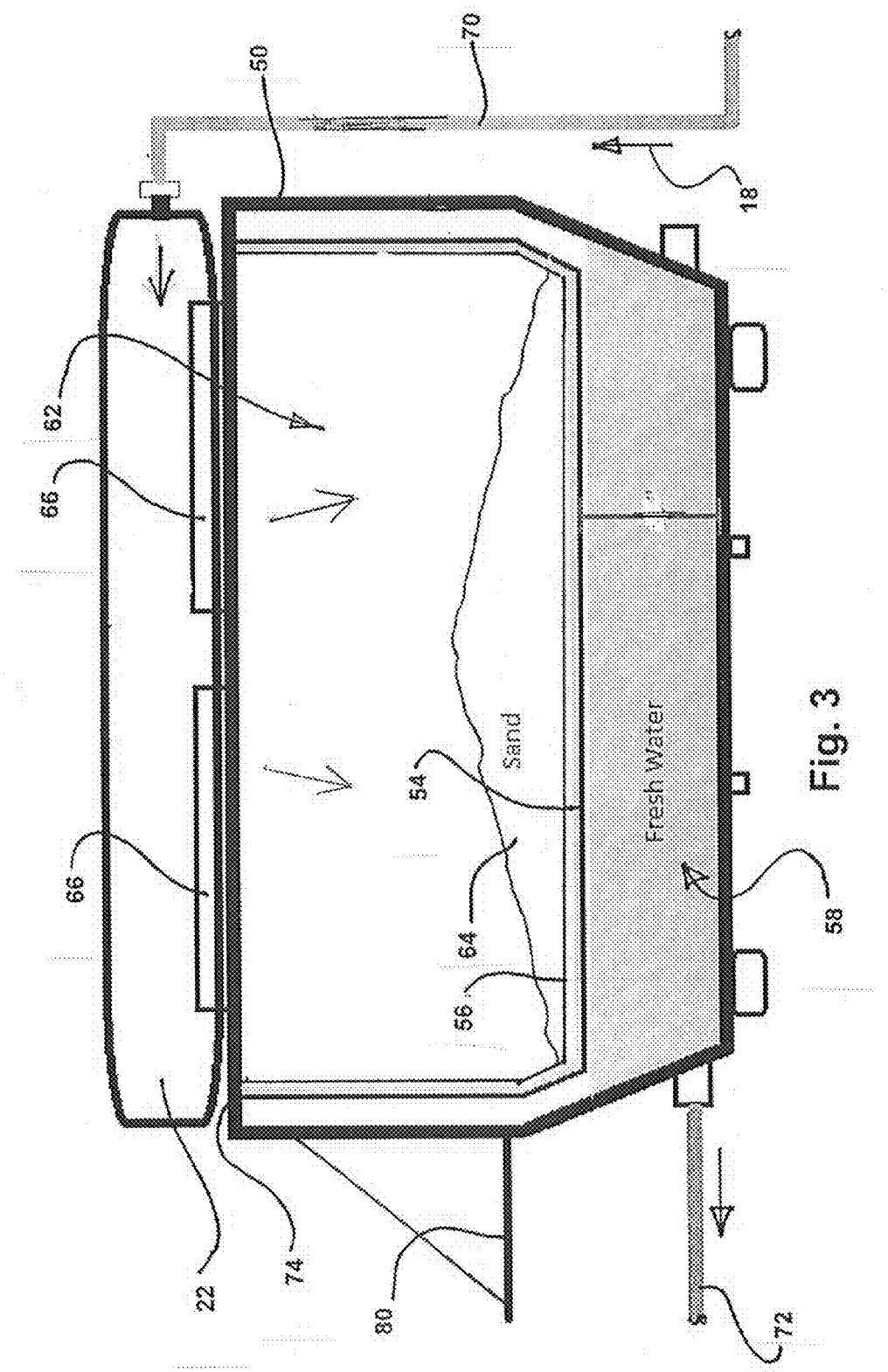
FIG. 3 is a front or lateral section view of the sand separator shown in FIG. 2.

Turning now in detail to the drawings, and specifically to FIGS. 1-3, a new separator 20 for use in well operations has a tank or box 50, which may be provided as a roll-off box. The separator 20 can then be readily moved to a well site via a roll-off truck. As shown in FIGS. 2 and 3, a particle barrier 56 divides the interior space of the tank 50 into an upper compartment 62 and a lower compartment 58. The particle barrier 56 may be a filter material or liner, a screen, or other element that will allow water, but not particles, to pass through it. For well operations, the particles are typically sand particles, as further described below.

A particle barrier support 54 may be used to support the particle barrier 56. For example, where a non-structural material, such as filter material, mesh, or screen is used as the particle barrier, a metal (e.g., steel) support may be provided to support the particle barrier. As one example, as shown in FIGS. 2 and 3, a steel support 54 is supported on bars within the tank 50. In this case, the support 54 may be perforated or punched steel sheet, formed into a five-sided box within the tank 50. One or more fold down walkways 80 may be provided on the outside of the tank 50, to provide easy access for installing, operating and maintaining the separator 20, and for collecting samples of material from the tank 50.

Figure 7:
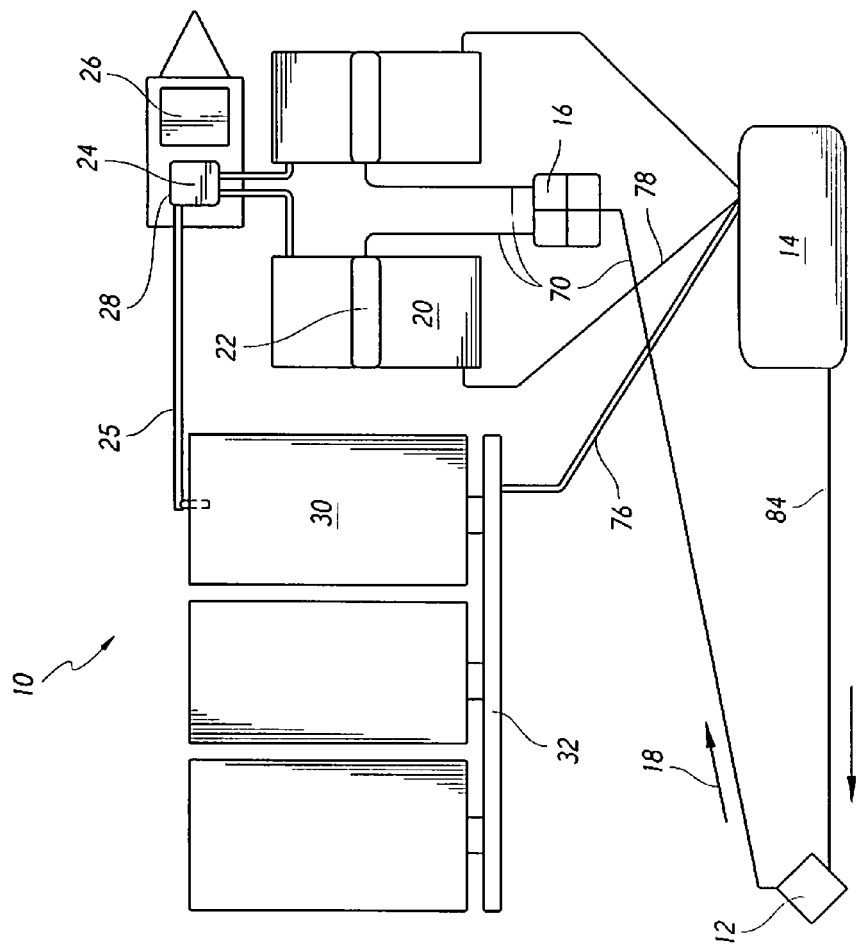
FIG. 7 is a schematic diagram illustrating one example of use of the present new sand separator in well operations.

FIG. 7 shows an example of the use of the separator 20. In this example, at the well site 10, the return water 18 from the well head 12 flows under return pressure through return pipelines 70, optionally through a manifold 16, to one or more separators 20. Referring now to FIGS. 2-5, the return water 18 enters into a gas separator 22, also known as a gas buster, which may be positioned on, or permanently attached to, a top surface or cover 74 of the tank 50 of the separator 20. The gas separator 22 separates well gas, typically natural gas, from the return water 18 flowing through the gas separator 22. The gas may then be vented to the atmosphere through an exhaust 82. The return water 18 flows out of the gas separator and into the tank 50. The gas separator 22 may be attached as an integral part of the tank 50 of the separator 20. The tank 50 may have solid rolling lids 52 which can be opened during operation of the separator 20, to allow the return water to flow out of the gas separator 22 and into the tank. The solid rolling lids 52 may be closed during transport of the separator 20, to prevent release of sand from the tank 50, as is required by Department of Transportation laws.

FIG. 7 shows use of two separators 20 and a manifold 16. When one separator is filled from ongoing use, it may be disconnected, picked up by the roll-off truck 42, and moved to a disposal site where the contents of the separator 20 may be emptied. During this time, the second separator 20 continues to operate. As a result, there is no interruption in handling of return water from the well. Well operations therefore can continue uninterrupted. The manifold 16 may optionally be set up to route return water to two, three, four or more separators 20, depending on the volume of return water to be handled and other factors. Valves and disconnect fittings may be used in the pipelines shown in FIG. 7, as is well known in the field.

The return water 18 contains entrained particles, such as sand particles, which are preferably separated out from the water. This occurs within the tank 50. Referring still to FIGS. 2-5, after degasification, the return water 18 flows or drains out of the gas separator 22 via outlets 66 and moves into the upper compartment 62 of the tank 50. From the upper compartment 62, water moves through the barrier 56 into the lower compartment 58. Particles in the water are blocked by the barrier 56 and remain in the upper compartment 62. As shown in FIG. 3, the particles, such as sand 64, accumulate on top of the barrier 56. As additional return water 18 moves into the tank 50, water (largely free of particles) accumulates in the lower compartment 58 and particles accumulate in the upper compartment 62.

Referring once again to FIG. 7, to maintain the particle separating operation, the water level in the tank should remain below the barrier 56, by pumping water out of the lower compartment 58 via pipelines 72. One option is to pump water from the lower compartment back via a second pump pipeline 78 to the well head for reuse, via a reverse pump 14 and a reverse pipeline 84. Water from the lower compartment 58 may in addition, or alternatively, be pumped out through a transfer pipeline 25 to one or more holding tanks, such as the frac tanks 30. In FIG. 7, a transfer pump 24 driven by a generator 26 on a pump/generator trailer 28 is used for this purpose. Water may be stored in the frac tanks 30 until it is withdrawn via a manifold 32 and reused in the well via a first pump pipeline 76, the reverse pump 14, and the reverse pipeline 84.

Thus, novel apparatus and methods have been shown and described. Various changes and substitutions may of course be made without departing from the spirit and scope of the invention. The invention, therefore, should not be limited, except by the following claims and their equivalents.

The invention claimed is:

1. Well equipment, comprising:
a return pipeline connecting a well head to a gas separator on top of a sand separator box;
a transfer pipeline connecting the sand separator box to one or more frac tanks;
a first pump pipeline connecting one or more of the frac tanks to a reverse pump;
a second pump pipeline connecting the sand separator box to the reverse pump; and
a reverse pipeline connecting the reverse pump to the well head;
with the sand separator box including:
a tank; a filter fixed in place in the tank and dividing the tank into an upper compartment and a lower compartment, with the filter adapted to allow water to pass from the upper compartment into the lower compartment, while filtering out sand in the water and keeping the sand in the upper compartment; the gas separator having one or more outlets above the upper compartment of the tank; with the second pump pipeline and the transfer pipeline both connected to the lower compartment of the tank.

2. The well equipment of claim 1 further comprising a manifold in the return pipeline.

3. The well equipment of claim 1 with the
tank on a roll-off container; and
at least one movable lid over the upper compartment of the tank.

4. The well equipment of claim 3 with the at least one movable lid comprising a sliding lid on a first side of the gas separator, and further including a second sliding lid on a second side of the gas separator, opposite from the first side.

* * * * *